United States Patent [19]

Stegmeier et al.

[11] Patent Number: 4,460,631
[45] Date of Patent: Jul. 17, 1984

[54] SEALABLE, BIAXIALLY STRETCHED POLYPROPYLENE FILM HAVING HIGH SCRATCH RESISTANCE, AND PROCESS FOR ITS MANUFACTURE

[75] Inventors: Gerhard Stegmeier, Mainz; Siegfried Janocha, Wiesbaden; Hartmut Hensel, Schlangenbad, all of Fed. Rep. of Germany

[73] Assignee: Hoechst Aktiengesellschaft, Frankfurt am Main, Fed. Rep. of Germany

[21] Appl. No.: 315,612

[22] Filed: Oct. 28, 1981

[30] Foreign Application Priority Data

Nov. 3, 1980 [DE] Fed. Rep. of Germany ....... 3041286

[51] Int. Cl.³ .............................................. B32B 27/08
[52] U.S. Cl. ...................................... 428/35; 428/335; 428/349; 428/910; 428/516; 427/348; 427/398.1; 156/229; 156/244.74; 156/244.11; 426/106; 426/127
[58] Field of Search .............. 156/229, 244.24, 244.11; 428/516, 910, 35; 427/348, 398.1; 426/106, 127

[56] References Cited

U.S. PATENT DOCUMENTS

| T955,009 | 2/1977 | Lansbury et al. | 428/515 |
|---|---|---|---|
| 4,197,150 | 4/1980 | Breidt et al. | 156/229 |
| 4,198,256 | 4/1980 | Andrews et al. | 156/229 |
| 4,252,851 | 2/1981 | Lansbury et al. | 428/516 |
| 4,333,968 | 6/1982 | Nahmias | 428/349 |
| 4,348,457 | 9/1982 | Rosenthal et al. | 428/349 |

FOREIGN PATENT DOCUMENTS

| 0001898 | 10/1981 | European Pat. Off. . |
| 2208619 | 8/1972 | Fed. Rep. of Germany . |
| 2637978 | 3/1978 | Fed. Rep. of Germany . |
| 941898 | 11/1963 | United Kingdom . |
| 951867 | 3/1964 | United Kingdom . |
| 992930 | 5/1965 | United Kingdom . |
| 1440317 | 6/1976 | United Kingdom . |
| 2015426 | 9/1979 | United Kingdom . |

*Primary Examiner*—George F. Lesmes
*Assistant Examiner*—E. Rollins Buffalow
*Attorney, Agent, or Firm*—Schwartz, Jeffery, Schwaab, Mack, Blumenthal & Koch

[57] ABSTRACT

Disclosed is a sealable, biaxially stretched polyethylene-coated polypropylene film, preferably manufactured as a flat film, which is not only extremely scratch-resistant but is also rapidly sealable, with good machine-running characteristics and high transparency. The polyethylene sealing layer has a scratch resistance of $\leq 50\%$ gloss reduction, relative to an initial gloss of 100%, measured according to ASTM Standard Specification D673-70 (1976), and a density of $\geq 0.94$ g/cm³, preferably of $\geq 0.95$ g/cm³. Also disclosed is a process for the manufacture of the film, and the use of the film as an abrasion-resistant packaging material.

22 Claims, No Drawings

SEALABLE, BIAXIALLY STRETCHED POLYPROPYLENE FILM HAVING HIGH SCRATCH RESISTANCE, AND PROCESS FOR ITS MANUFACTURE

BACKGROUND OF THE INVENTION

The present invention relates to a polyethylene-coated, biaxially stretched polypropylene film which can be sealed rapidly, is extremely scratch-resistant and exhibits good transparency. The invention also relates to a process for the manufacture of the film and to the use of the film in abrasion-resistant packaging applications.

Polyethylene-coated, monoaxially or biaxially stretched polypropylene films are known from the prior art. The polyethylene layers can be applied to the polypropylene layer in various ways.

Thus, German Auslegeschrift No. 1,294,005 describes single-sided or double-sided lamination of polypropylene films with polyethylene films, with subsequent stretching. British Patent Specification No. 941,898 describes the manufacture of composite tubings from polyethylene and polypropylene, the layers being co-extruded and the composite material thus produced then being stretched in the longitudinal direction. This patent states that the polyethylene should have a density of $\leq 0.93$ g/cm$^3$. Such prior art films have been used for a considerable time, preferably in the packaging sector, for example, for producing packaging for solid goods, such as foodstuffs, for example, pasta, rice and others, or as a wrapping for cardboard box packagings. All films previously known and on the market, however, have the disadvantage of a relatively high sensitivity to scratching, due to the polyethylene used as the sealing layer.

Thus, for example, hard foodstuffs, such as pasta, rice and others, scratch the inside of the packaging, for example, during filling and/or during subsequent transportation. Furthermore, if films according to the prior art are used, roughening and/or scratching can result even during the manufacture of the packaging and/or within the subsequently used packaging lines, because of friction of the film against the machine parts. Such roughening and/or scratching results in clouding and in a reduction of the gloss of the film, and these changes are not acceptable to either the manufacturer of the packaging, the packer or the consumer.

SUMMARY OF THE INVENTION

It is therefore an object of the present invention to provide an improved polyethylene-polypropylene composite film.

In particular, it is an object of the invention to provide an improved polyethylene-polypropylene composite film which is rapidly sealable, has a high scratch resistance, good machine-running properties, and a high degree of transparency.

It is also an object of the invention to provide a polyethylene-polypropylene composite film which maintains these desirable properties even during very high machine-running speeds in the manufacturing of packaging and in packaging and wrapping lines.

Yet another particular object of the invention is to provide an improved polyethylene-polyproplene composite film wherein the film is flat.

Still another object of the invention is to provide an improved process for producing a polyethylene-polypropylene composite film.

A further object of the present invention resides in providing an improved process for producing a polypropylene film having a layer of polyethylene applied to at least one side of the polypropylene film.

Another object of the invention resides in providing an abrasion-resistant packaged article.

In accomplishing the foregoing objects, there has been provided in accordance with one aspect of the present invention a sealable, biaxially stretched polypropylene film, comprising a polypropylene layer and at least one polyethylene layer applied to at least one side of the propylene layer and having a scratch resistance of $\leq$ about 50%, more preferably $\leq$ about 40%, gloss reduction, relative to an initial gloss of 100%, measured according to ASTM standard specification D673-70, and a density of $\geq$ about 0.94 g/cm$^3$, preferably $\geq$ about 0.95 g/cm$^3$.

In a preferred embodiment, the thickness of the polyethylene layer comprises $\leq$ about 2 µm, and more preferably $\leq$ about 1 µm.

In accordance with another aspect of the invention, there has been provided a process for preparing a sealable, biaxially stretched polypropylene film, comprising the steps of providing a polypropylene layer, coating the polypropylene layer with at least one hot polyethylene layer and thereby bonding the polyethylene layer to the polypropylene layer to form a film, biaxially stretching the film, and immediately chilling the hot polyethylene layer of said film.

In a preferred embodiment of the present invention, there is provided a process for preparing a sealable, biaxially stretched polypropylene film wherein the polyethylene layer is co-extruded onto an extruded polypropylene layer.

According to another aspect of the invention, there has been provided a packaged article wherein the packaging includes at least a portion of the film produced according to the invention.

Further objects, features and advantages of the present invention will become apparent from the detailed description of preferred embodiments which follows.

DETAILED DESCRIPTION OF THE PREFERRED EMBODIMENTS

The present invention begins with a polypropylene film to which a layer of polyethylene is applied, at least to one side. The polypropylene raw materials used for the manufacture of the films may also comprise those raw materials which are copolymerized, to a minor extent, with other olefins, such as, e.g., ethylene and/or butene. The ethylene raw materials which are applicable for the sealing layer may also include a minor amount of one or more comonomers. Generally, the comonomers are present in the propylene and/or ethylene polymers in an amount less than about 20% by weight, preferably less than about 10% by weight.

Both raw materials can contain additives, for example, anti-static agents, anti-blocking agents and slip agents, dyes, pigments and others, whereby the surface properties can be modified in accordance with the desired end use.

The thickness of the polyethylene layer or layers is less than about 2 µm, preferably less than about 1 µm, since at higher thicknesses of the layers the composite material experiences reduced transparency because of the inherently more cloudy polyethylene.

The composite film is preferably manufactured by co-extrusion, but it is also possible to produce it by heat lamination or by melt coating. The melt coating with polyethylene can be effected onto a non-stretched, monoaxially stretched or biaxially stretched polypropylene film. However, it is preferred that the polyethylene be applied after the longitudinal stretching and before the lateral stretching of the polypropylene film.

To improve the adhesion to printing inks, the finished composite material can also additionally be subjected to a generally known corona treatment on one or both sides.

The process for the manufacture of the film consists in chilling immediately after bonding to the polypropylene layer, the hot polyethylene layer or layers, which can be applied in accordance with the processes mentioned above and otherwise known per se. Chilling is preferably effected by means of a stream of gas and/or a cooling bath. Preferably, the chilling is effected in such a way that the temperature of the polyethylene layer or layers assumes a value of $\leq$ about 70° C.

In a co-extrusion process used to manufacture the film, the process parameters have, for example, the following values:

| | |
|---|---|
| melt temperature of polypropylene | about 240 to 280° C. |
| melt temperature of polyethylene | about 230 to 250° C. |
| cooling roller | about 30 to 35° C. |
| longitudinal stretching temperature | about 120 to 140° C. |
| lateral stretching temperature | about 160 to 170° C. |
| longitudinal stretch ratio | about 4.5 to 6.5 |
| lateral stretch ratio | about 8 to 12 |
| heat-setting | about 150 to 160° C. |

The invention will now be again explained in more detail with the aid of the examples which follow, without however implying any limitation thereto.

EXAMPLE 1

A two-layer film is produced by co-extrusion. An isotactic polypropylene of a density of 0.91 g/cm³ is heat plastified for the base layer in an extruder at 250° C., and a polyethylene of a density of 0.965 g/cm³, for the sealing layer, is heat plastified in a separate extruder at 240° C. The materials are co-extruded through a two-layer slot die to form a two-layer composite material. This composite material is chilled on the polyethylene side, by means of an air knife, to a temperature of 66° C. The composite sheeting thus produced is then stretched longitudinally by means of rollers at a temperature of 138° C., the stretch ratio being 6.0. The subsequent lateral stretching, in a stretch ratio of 10, is effected at a temperature of 168° C. The heat-setting is effected at 160° C.

EXAMPLE 2

Example 1 is repeated, with the following differences:

| | |
|---|---|
| use of polyethylene having a density of | 0.952 g/cm³ |
| melt temperature of polyethylene | 235° C. |
| longitudinal stretching temperature | 140° C. |
| lateral stretching temperature | 173° C. |

EXAMPLE 3

Example 1 is repeated, with the difference being that a copolymer of 95.2% of ethylene and 4.8% of propylene is used for the sealing layer.

The thickness of the polypropylene base film is 35 μm in all examples and the thickness of the polyethylene layer is 1 μm in each case.

A comparison between the measured properties of the films produced according to the present invention and those produced according to the prior art is given in Table I, which follows. The measured properties are determined as follows:

Scratch resistance

According to ASTM D673-70 (1976), using 0.2 kg of silicon carbide No. 80, and a 60° angle.

Seal strength

Two 15 mm wide strips are superposed and sealed at 130° C. with a sealing time of 0.1 second and a sealing pressure of 0.15 bar. The seal strength is determined by the T-peel method.

Machine-running characteristics

The machine-running characteristics are tested on a wrapping machine for small cardboard boxes. If no running problems result over a length of material of 2,000 m, the film is classified as good.

Cloudiness

The cloudiness is measured by means of a cloudiness measuring apparatus (built by the Applicant's assignee and based on an Ulbricht globe with an encompassed solid angle of forward scattering of 166°, and an angle of 0.8° blanked out from the apparatus), on four superposed layers of the film.

TABLE I

| | Examples | | | Prior art film |
|---|---|---|---|---|
| | 1 | 2 | 3 | |
| Reduction in gloss, % (scratch resistance) | 28 | 35 | 30 | 71 |
| Seal strength, N/15 mm | 1.0 | 1.4 | 0.9 | 0.8 |
| Machine-running characteristics | good | good | good | good |
| Cloudiness | 18 | 25 | 20 | 35 |

As shown by the table, the values of the seal strength and machine-running characteristics of the prior art film are acceptable. The cloudiness value is just on the limit of acceptable cloudiness. The comparative figures for the scratch resistance however show the considerable superiority of the films according to the invention.

What is claimed is:

1. A sealable biaxially stretched composite polypropylene film, comprising:
   a substrate layer comprising polypropylene; and
   at least one heat-sealable ethylene polymer layer comprising an ethylene polymer applied to at least one side of said polypropylene layer and having a scratch resistance of $\leq$ about 50% gloss reduction, relative to an initial gloss of 100%, measured according to ASTM standard specification D673-70 and a density of 24 about 0.95 g/cm³, wherein said ethylene polymer comprises polyethylene or a copolymer of ethylene and a minor amount of a comonomer which is copolymerizable with said ethylene, prepared by a process comprising the steps of:

providing said polypropylene substrate layer;

coating said polypropylene substrate layer with at least one of said ethylene polymer layers in a heated condition and thereby bonding said ethylene polymer layer to said polypropylene layer to form a film;

immediately chilling said hot ethylene polymer layer of said film to a first temperature of less than or equal to about 70° C.; and subsequently stretching the composite film at a second temperature higher than said first temperature.

2. A sealable, biaxially stretched polypropylene film as defined in claim 1, wherein said scratch resistance of said ethylene polymer layer comprises ≦ about 40% gloss reduction.

3. A sealable, biaxially stretched polypropylene film as defined in claim 1, wherein the film has a seal strength of ≧ about 0.4N/15 mm.

4. A sealable, biaxially stretched polypropylene film as defined in claim 1, wherein the thickness of said ethylene polymer layer comprises ≦ about 2 μm.

5. A sealable, biaxially stretched polpropylene film as defined in claim 4, wherein said thickness comprises ≦ about 1 μm.

6. A sealable, biaxially stretched polypropylene film as defined in claim 1, wherein said polypropylene layer contains at least one additive.

7. A sealable, biaxially stretched polypropylene film as defined in claim 1, wherein said ethylene polymer layer contains at least one additive.

8. A sealable, biaxially stretched polypropylene film as defined in claim 1, wherein said polypropylene and said ethylene polymer layers each contain at least one additive.

9. A sealable, biaxially stretched polypropylene film as defined in claim 1, wherein said polypropylene comprises a copolymer of propylene and a minor amount of a comonomer which is copolymerizable with the propylene.

10. A sealable, biaxially stretched polypropylene film as defined in claim 1 or claim 9, wherein said ethylene polymer comprises a copolymer of ethylene and a minor amount of a comonomer which is copolymerizable with the ethylene.

11. A sealable, biaxially stretched polypropylene film as defined in claim 9, wherein said comonomers are present in an amount of less than about 20%.

12. A sealable, biaxially stretched polypropylene film as defined in claim 11, wherein said comonomers are present in an amount of less than about 10%.

13. A sealable, biaxially stretched polypropylene film as defined in claim 1, wherein all of the layers are biaxially oriented.

14. A sealable, biaxially stretched polypropylene film as defined in claim 1, wherein said polypropylene layer is relatively thick in comparison to said ethylene polymer layer.

15. A sealable, biaxially stretched polypropylene film as defined in claim 14, wherein the thickness of said polypropylene layer is about 35 μm and the thickness of said ethylene polymer is ≦ about 2 μm.

16. A sealable, biaxially stretched polypropylene film as defined in claim 15, wherein the thickness of said polypropylene layer is about 35 μm and the thickness of said ethylene polymer is ≦ about 1 μm.

17. A process for preparing sealable, biaxially stretched polypropyene film according to claim 1, comprising the steps of:

providing said polypropylene substrate layer;

coating said polypropylene substrate layer with at least one of said ehtylene polymer layers in a heated condition and thereby bonding said ethylene polymer layer to said polypropylene layer to form a film;

biaxially stretching said film; and immediately chilling said hot ethylene polymer layer of said film to a first temperature of less than or equal to about 70° C.; and subsequently stretching the composite film at a second temperature higher than said first temperature.

18. A process for preparing sealable, biaxially stretched polypropylene film as described in claim 17, wherein said ehtylene polymer layer is co-extruded with said polypropylene layer.

19. A process for preparing sealable, biaxially stretched polypropylene film as described in claim 17, wherein said ethylene polymer layer is applied subsequent to longitudinal stretching and prior to lateral stretching of said polypropylene layer.

20. A process for preparing sealable, biaxially stretched polypropylene film as described in claim 17, wherein said ethylene polymer layer is chilled by a gas jet.

21. A process for preparing sealable, biaxially stretched polypropylene film as described in claim 17, wherein said ethylene polymer layer is chilled by a cooling bath.

22. A process as defined in claim 17, wherein all the layers are biaxially oriented.

* * * * *

UNITED STATES PATENT AND TRADEMARK OFFICE
CERTIFICATE OF CORRECTION

PATENT NO. : 4,460,631
DATED : Jul. 17, 1984
INVENTOR(S) : Gerhard STEGMEIER

It is certified that error appears in the above—identified patent and that said Letters Patent is hereby corrected as shown below:

Column 4, line 65 (Claim 1): "and a density of 24 about 0.95 g/cm$^3$" should read -- and a density of $\geq$ about 0.95 g/cm$^3$ --; and Column 6, line 20 (Claim 17): "stretched polypropyene film" should read -- stretched polypropylene film --.

Signed and Sealed this

Twenty-seventh Day of November 1984

[SEAL]

Attest:

GERALD J. MOSSINGHOFF

Attesting Officer

Commissioner of Patents and Trademarks